US011369879B2

United States Patent
Juliani, Jr. et al.

(10) Patent No.: US 11,369,879 B2
(45) Date of Patent: Jun. 28, 2022

(54) METHOD AND SYSTEM FOR INTERACTIVE IMITATION LEARNING IN VIDEO GAMES

(71) Applicant: Unity IPR ApS, Copenhagen (DK)

(72) Inventors: Arthur William Juliani, Jr., San Francisco, CA (US); Mohamed Marwan A. Mattar, San Francisco, CA (US)

(73) Assignee: Unity IPR ApS, Copenhagen (DK)

( * ) Notice: Subject to any disclaimer, the term of this patent is extended or adjusted under 35 U.S.C. 154(b) by 314 days.

(21) Appl. No.: 16/657,868

(22) Filed: Oct. 18, 2019

(65) Prior Publication Data

US 2020/0122040 A1    Apr. 23, 2020

Related U.S. Application Data (60) Provisional application No. 62/747,471, filed on Oct. 18, 2018.

(51) Int. Cl.
| | |
|---|---|
| *A63F 13/67* | (2014.01) |
| *G06K 9/62* | (2022.01) |
| *G06N 20/00* | (2019.01) |
| *G06N 3/02* | (2006.01) |

(52) U.S. Cl.
CPC ............ *A63F 13/67* (2014.09); *G06K 9/6256* (2013.01); *G06N 20/00* (2019.01); *G06N 3/02* (2013.01)

(58) Field of Classification Search
CPC .......... A63F 13/67; G06N 20/00; G06N 3/08; G06N 3/006
See application file for complete search history.

(56) References Cited

U.S. PATENT DOCUMENTS

| | | | |
|---|---|---|---|
| 2017/0364831 A1* | 12/2017 | Ghosh | G06N 7/005 |
| 2019/0272465 A1* | 9/2019 | Kimura | G06N 3/0481 |

OTHER PUBLICATIONS

Tucker et al., Inverse Reinforcement Learning for Video Games (Oct. 24, 2018). (Year: 2018).*
Harmer, J., et al., "Imitation Learning with Concurrent Actions in 3D Games", Sep. 6, 2018. Retrieved on Oct. 9, 2018. Retrieved from the internet: <https://arxiv.org/pdf/1803.05402v5.pdf>, 8 pgs.

* cited by examiner

*Primary Examiner* — James S. McClellan
(74) *Attorney, Agent, or Firm* — Schwegman Lundberg & Woessner, P.A.

(57) ABSTRACT

In example embodiments, a method of interactive imitation learning method is disclosed. An input is received from an input device. The input includes data describing a first set of example actions defining a behavior for a virtual character. Inverse reinforcement learning is used to estimate a reward function for the set of example actions. The reward function and the set of example actions is used as input to a reinforcement learning model to train a machine learning agent to mimic the behavior in a training environment. Based on a measure of failure of the training of the machine learning agent reaching a threshold, the training of the machine learning agent is paused to request a second set of example actions from the input device. The second set of example actions is used in addition to the first set of example actions to estimate a new reward function.

17 Claims, 5 Drawing Sheets

METHOD AND SYSTEM FOR INTERACTIVE IMITATION LEARNING IN VIDEO GAMES

CROSS-REFERENCE TO RELATED APPLICATIONS

This application claims the benefit of U.S. Provisional Application No. 62/747,471, filed Oct. 18, 2018, which is incorporated by reference herein in its entirety.

TECHNICAL FIELD

The present invention relates to the field of artificial intelligence; and in one specific example, to tools for creating artificial intelligence agents in video game environments.

BACKGROUND OF THE INVENTION

Defining non-player character (NPC) behavior in a video game environment for complex games can be a time-consuming and brittle process. It is often accomplished by specifying a large number of heuristic rules that can be difficult to manage and unintuitive to define. The use of machine learning (ML) can also be used to define NPC behavior. Learning behaviors through demonstrations is a research problem in machine learning, typically referred to as imitation learning, learning from demonstrations and apprenticeship learning. Imitation learning originated in scientific disciplines such as robotics, and is typically a long process that requires much expertise. It is difficult to know in advance which specific demonstrations are required to teach an artificial intelligence agent a desired behavior via imitation learning. This difficulty is often mitigated in current technology by collecting extremely large sets of demonstrations; however, this is undesirable and inefficient when the demonstrations are provided in real-time by humans (e.g., since there may be an associated financial cost).

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

In example embodiments, a method of interactive imitation learning method is disclosed. An input is received from an input device. The input includes data describing a first set of example actions defining a behavior for a virtual character. Inverse reinforcement learning is used to estimate a reward function for the set of example actions. The reward function and the set of example actions is used as input to a reinforcement learning model to train a machine learning agent to mimic the behavior in a training environment. A plurality of actions performed by the trained machine learning agent is analyzed in the training environment to determine a measure of failure of the training of the machine learning agent. Based on the measure of failure reaching a threshold, the training of the machine learning agent is paused to request a second set of example actions from the input device. The second set of example actions is used in addition to the first set of example actions to estimate a new reward function.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

The term 'game' used herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'game object', used herein is understood to include any digital object or digital element within an environment. A game object can represent (e.g., in a corresponding data structure) almost anything within the environment; including characters, weapons, scene elements (e.g., buildings, trees, cars, treasures, and the like), backgrounds (e.g., terrain, sky, and the like), lights, cameras, effects (e.g., sound and visual), animation, and more. A game object is associated with data that defines properties and behavior for the object.

The terms 'asset', 'game asset', and 'digital asset', used herein are understood to include any data that can be used to describe a game object or can be used to describe an aspect of a game or project. For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

The term 'behavior' as used herein should be understood to include a collection of choices (e.g., made by a human or artificial intelligence agent), to apply one or more actions to a virtual character in response to an environmental situation or stimulus involving the character. The choices include longer term strategic decisions to apply the one or more actions with a time delay from the situation or the stimulus.

Turning now to the drawings, systems and methods for Interactive Imitation Learning in accordance with embodiments of the invention are illustrated. In many embodiments, there is provided an interactive imitation learning system which provides a user interface (UI) to interactively capture behavior data from an input (e.g., game controller, keyboard or the like) controlled by a user (e.g., a human). The Interactive Imitation Learning system uses examples of behaviors captured from the user via the input to teach a machine learning (ML) model which generates behavior that is applied to an NPC. The capture and generation of behaviors as described herein with respect to the Interactive Imitation Learning system is interactive, the interactivity helping to reduce an amount of time required from the user to provide example behaviors. In accordance with an embodiment, the interactive imitation learning system provides an input (e.g., a UI) wherein the user provides a small initial set of demonstrations of example behaviors, and then the interactive imitation learning system interactively prompts the user (e.g., via the UI) to provide additional demonstrations of example behaviors as necessary during a ML model training process. The prompting of the additional demonstrations can be based on a monitoring of the ML model training process and a determination that the training process is not progressing adequately, wherein the monitoring and the determining are done by a user (e.g., via the UI) or the interactive imitation learning system. The interactive imitation learning system provides game creators (e.g., developers) without coding abilities, a framework to create behaviors for game characters (e.g., NPCs) in an intuitive and guided manner.

Figure 1:
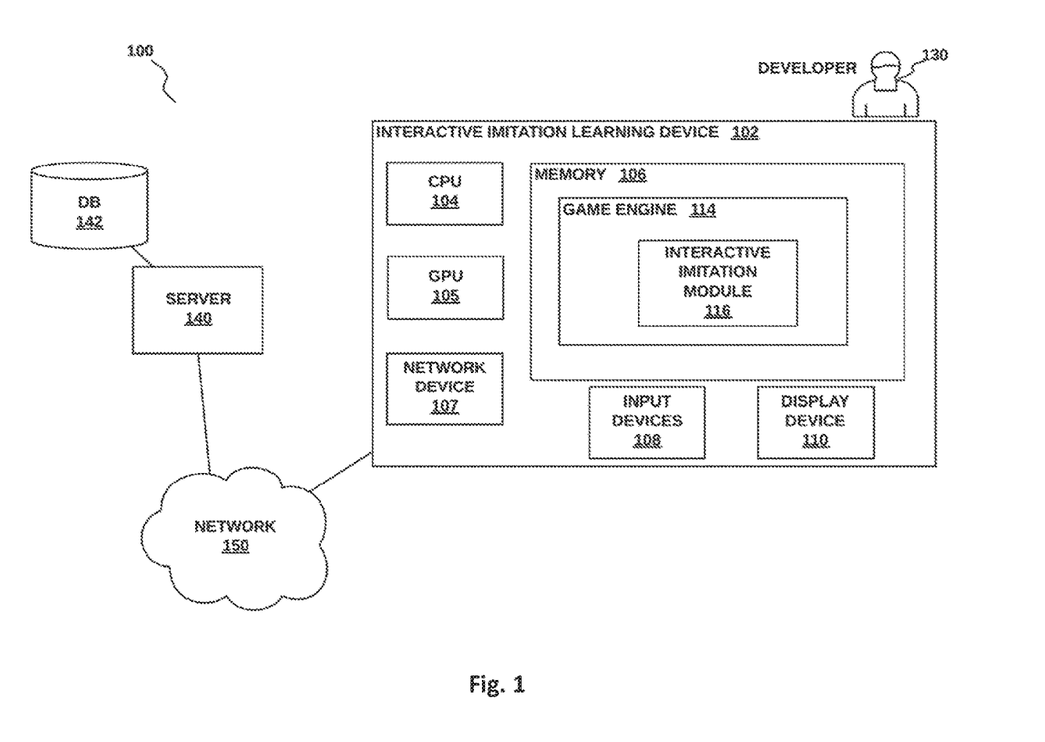
FIG. 1 is a schematic illustrating an interactive imitation learning device within an interactive imitation system, in accordance with one embodiment.

In accordance with an embodiment, FIG. 1 illustrates an Interactive Imitation Learning system 100. The system 100 includes an Interactive Imitation learning device 102 operated by a developer 130 (e.g., a game developer, a game creator, an artist, a user and the like), a server device 140, and a database 142. The interactive imitation learning device 102, the server device 140, and the database 142 can be coupled in networked communication via a network 150 (e.g., a cellular network, a Wi-Fi network, the Internet, a wired local network, and the like).

In accordance with an embodiment, the Interactive Imitation Learning device 102 includes one or more central processing units 104 (CPUs), and graphics processing units 105 (GPUs). The processing device 104 is any type of processor, processor assembly comprising multiple processing elements (not shown), having access to a memory 106 to retrieve instructions stored thereon, and execute such instructions. Upon execution of such instructions, the instructions implement the processing device 104 to perform a series of tasks as described herein. In other words, the processing device 104 is specially-configured to implement one or more tasks described herein (e.g., through deployment of specialized instructions into the memory 106 or execution of those specialized instructions by one or more computer processors).

The Interactive Imitation Learning device 102 further includes one or more display devices 110, such as a computer monitor, a touchscreen, and a head mounted display, which may be configured to display digital content including video, a video game environment, and integrated development environment and a virtual simulation environment to a developer 130. The display device 110 is driven or controlled by the one or more GPUs 105 and optionally the CPU 104. The GPU 105 processes aspects of graphical output that assists in speeding up rendering of output through the display device 110. The Interactive Imitation Learning device 102 also includes one or more networking devices 107 (e.g., wired or wireless network adapters) for communicating across the network 150.

The input device 108 can include any type of input unit such as a mouse, a keyboard, a touch screen, a joystick, a video game controller, a microphone, a camera, and the like, for inputting information in the form of a data signal readable by the processing device 104.

In some embodiments, the Interactive Imitation Learning device 102 is a mobile computing device, such as a smartphone, tablet computer and head mounted display (HMD) such as virtual reality HMDs, augmented reality HMDs and mixed reality HMDs, and the like. In some embodiments, the Interactive Imitation Learning device 102 is a desktop computer or game console.

The memory 106 can be any type of memory device, such as random-access memory, read only or rewritable memory, internal processor caches, and the like. The memory 106 in the Interactive Imitation Learning device 102 can be configured to store an application 114 (e.g., an integrated development environment IDE, a game engine, a video game, a simulation, a virtual reality experience, an augmented reality experience) that communicates with the display device 110 and also with other hardware such as the input device(s) 108 to present the application to the developer 130. The application may include a game engine that would include one or more modules that provide the following: animation physics for game objects, collision detection for game objects, rendering, networking, sound, animation, and the like in order to provide the user with the application environment, including a video game (or simulation) environment. The application 114 includes an interactive imitation module 116 that provides various Interactive Imitation Learning system functionality as described herein. The application 114 includes computer-executable instructions residing in the memory 106 that are executed by the CPU 104 and optionally with the GPU 105 during operation in order to create a runtime program (e.g., a game engine or IDE). The interactive imitation module 116 may be integrated directly within the application 114, or may be implemented as external pieces of software (e.g., plugins).

Figure 2:
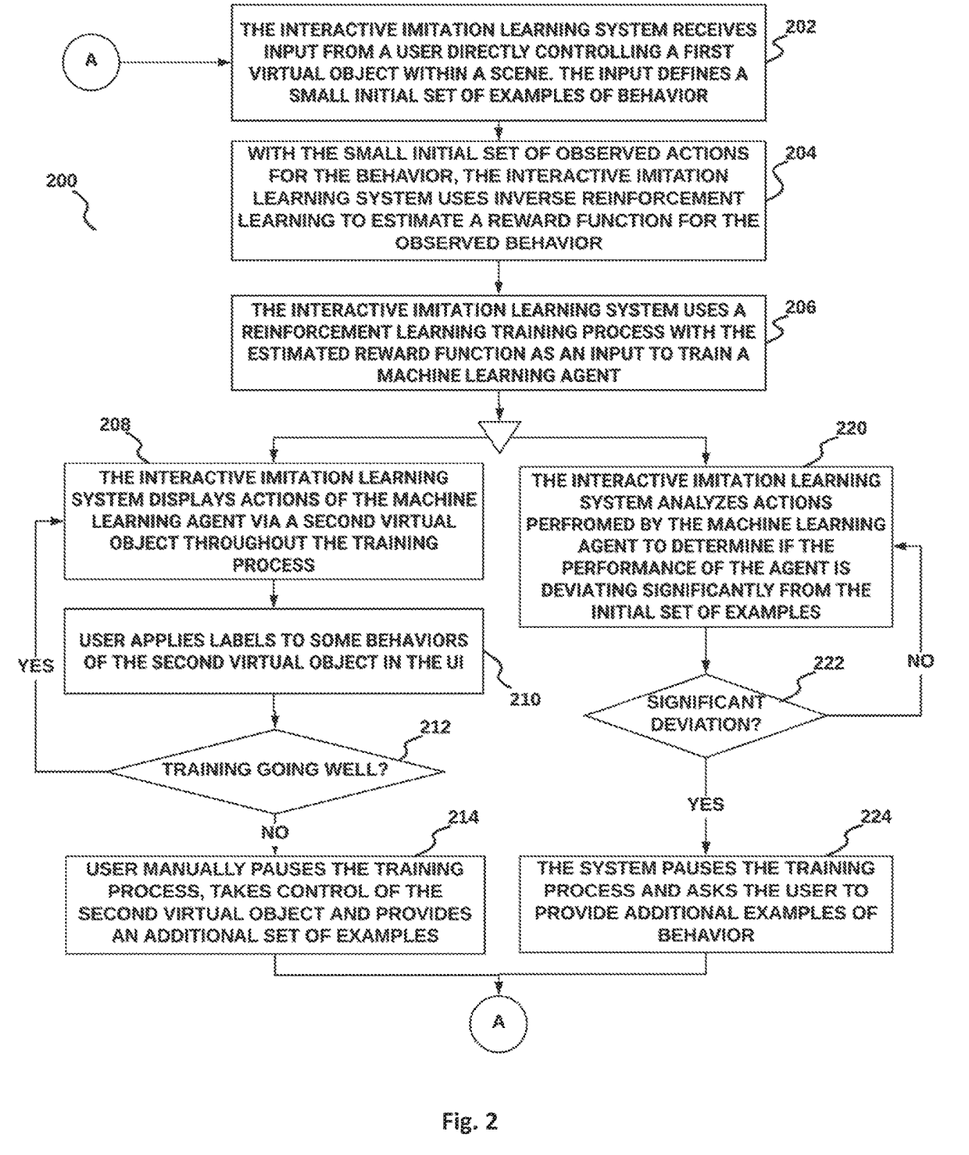
FIG. 2 is a schematic illustrating a flowchart for an interactive imitation learning method using an interactive imitation learning system, in accordance with one embodiment.

In accordance with an embodiment, FIG. 2 shows a flowchart for an interactive imitation learning method 200. The method 200 may be carried out using the interactive imitation learning system 100 shown in FIG. 1. For example, many of the operations of the method 200 may be performed by the interactive imitation module 116. As a first step in the method 200, at process 202, the interactive imitation learning module 116 receives input from a user (e.g., the developer 130), the input including data associated with the user directly controlling an NPC within a scene. While operation 202 (and operation 208 and operation 214 described below) may refer to an NPC (e.g., a non-playing character), the operation is not limited to NPCs, and the input may be used to control any virtual character or virtual object. The user may control the NPC with an input device 108. The input is used by the interactive imitation learning module 116 to describe a small initial set of actions that represent behavior for the NPC. The scene can be any virtual environment including a video game environment and a simulation environment as well as a real-world environment (e.g., controlling a virtual NPC in an augmented reality environment). The interactive imitation learning module 116 receives input data that includes sensory input data from the input devices 108 (e.g., joystick movements from a user), and data describing NPC behavior while under control from the sensory input (e.g., movement and action of the NPC through the environment), and data describing the environment (e.g., model data of the scene). At process 204 of the method 200, the interactive imitation learning module 116 takes the input data (e.g., which describes the small initial set of observed actions) and uses the data within an inverse reinforcement learning method to estimate a reward function that matches the observed behavior of the NPC (e.g., a reward function that may be optimized when used in a reinforcement learning method by an NPC performing the small initial set of observed actions). In accordance with an embodiment, at process 206, the interactive imitation learning module 116 uses a reinforcement learning training process to train a machine learning agent. The reinforcement learning training process using as input at least the estimated reward function and the data describing the small initial set of examples. The reinforcement learning training process is applied to the machine learning agent in a training environment (e.g., which can include performing the training in parallel on multiple computers or servers over a network 150). In accordance with an embodiment, at process 208 of the method 200, the interactive imitation learning module 116 displays actions of the machine learning agent (e.g., via a second NPC or other virtual object) throughout the training process on the display device 110. The displayed actions of the machine learning agent can include a high-speed view of the second NPC (e.g., controlled by the machine learning agent) interacting with the scene environment. As part of process 208, a user (e.g., the developer 130) observes the displayed actions of the machine learning agent via a user interface (UI) on the display device 110. At process 210, the user can apply a label to a displayed behavior (e.g., to one or more displayed actions). The label may be applied within the UI and may be applied with the help of viewing controls (e.g., viewing controls displayed within the UI by the interactive imitation module 116). The viewing controls may allow the user to slow, stop, rewind, fast-forward the displaying of the actions of the machine learning agent in order to facilitate the applying of the labels. In accordance with an embodiment, the label can be either positive or negative. A positive label indicates that the behavior of the machine learning agent is acceptable, and a negative label indicates that the behavior is unacceptable. Based on the training process proceeding well (e.g., due to a threshold of positive labels from operation 210) the interactive imitation learning module 116 continues to display the actions of the machine learning agent as part of process 208. Based on the training process not going well (e.g., due to a threshold of negative labels from operation 210), at process 214, the user manually pauses the training process (e.g., via the viewing controls), takes control of the second NPC and provides an additional set of examples of behavior (e.g., by looping back to process 202). While operation 214 may refer to an NPC (e.g., a non-playing character), the operation is not limited to NPCs, and the user may take control of a second virtual object.

In accordance with an embodiment, while the training process of 206 is ongoing, at process 220, the interactive imitation learning module 116 analyzes behavior (e.g., a plurality of actions) of the machine learning agent during the training process to determine if the learned behavior of the machine learning agent during the training process is deviating significantly from the behavior as described by the initial set of examples (e.g., as received by the module 116 during operation 202). In accordance with an embodiment, the analysis is performed with machine learning methods. For example; machine learning methods may be used to determine whether a learning agent trained within the training process of operation 206 is showing behavior that deviates in a significant way from the initial set of examples received during operation 202. The deviation may be measured as a literal deviation of actions performed by the learning agent when compared to actions as received within the initial set of examples from operation 202. The deviation may also be measured as a deviation of intent by the learning agent (e.g., as determined from a plurality of learning agent actions by the learning machine methods) from human intentions (e.g., as determined from the initial set of examples by the machine learning methods). Based on there being no significant deviation, the module 116 continues to perform the analysis in process 220. Based on there being significant deviation, the interactive imitation learning module 116 pauses the training process of operation 206 and asks the user to provide additional examples for the NPC behavior (e.g., by looping back to process 202).

Figure 3:
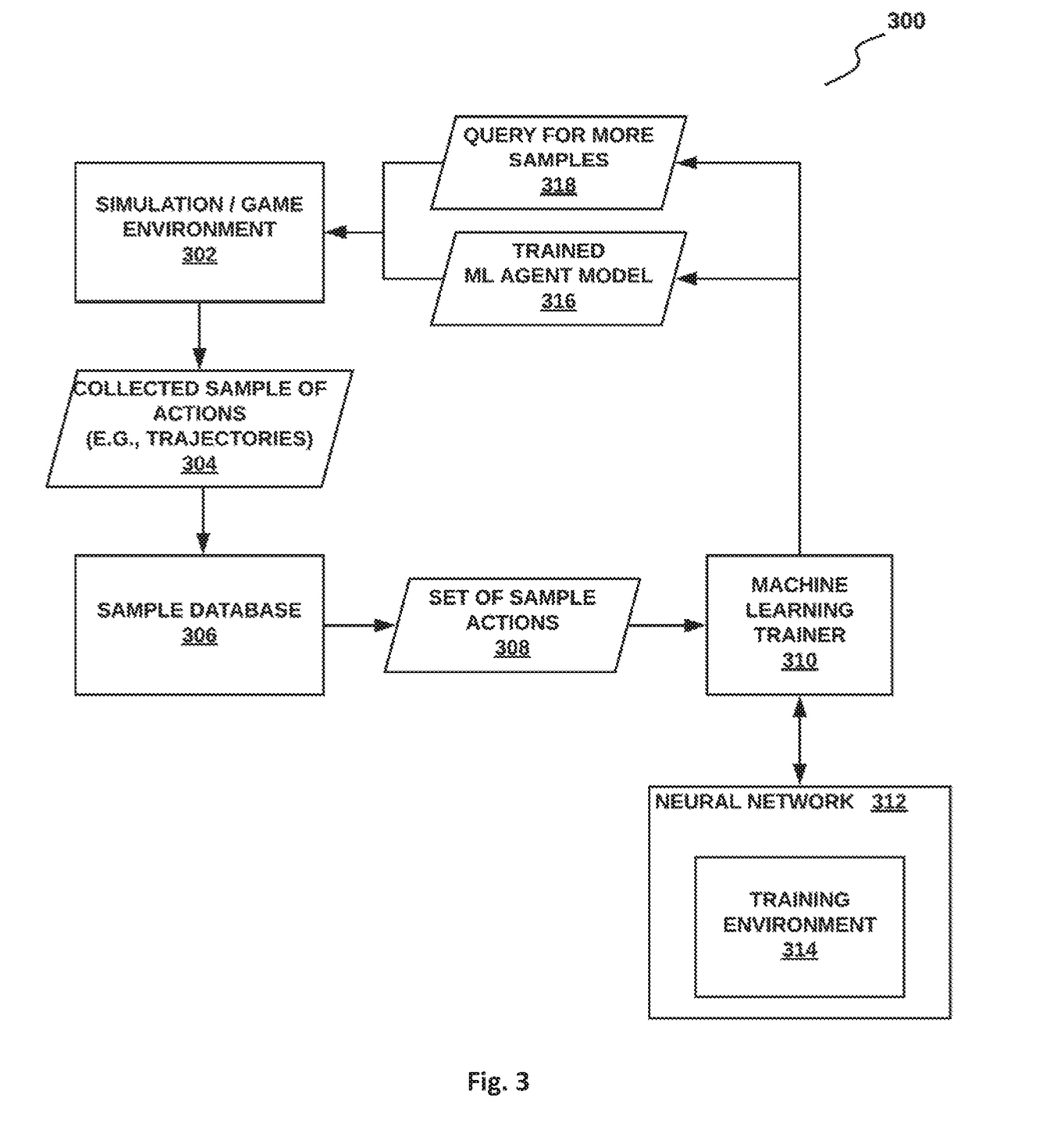
FIG. 3 is a schematic illustrating a data flowchart for an interactive imitation learning system, in accordance with one embodiment.

In accordance with an embodiment, FIG. 3 shows an illustration of an interactive imitation learning system data flowchart which follows the method 200 as described in FIG. 2. In accordance with an embodiment, as part of process 202 from the method 200, a user (e.g., developer 130) interacts with an environment 302 (e.g., simulation or game environment) to create samples 304 of behavior. The samples could include a plurality of actions performed by the NPC (e.g., including trajectories travelled by the NPC, objects gathered and moved by the NPC and what else??). The samples 304 can be sent and stored in a database 306. The database 306 may be local or may be accessed via the network 150. The database 306 may be similar to the database 142 described in FIG. 1. Continuing with FIG. 3, a set of sample actions 308 (e.g., sample trajectories) from the set of all samples within the sample database 306 are sent from the database 306 to a machine learning trainer 310. As part of the training of process 206, the ML trainer 310 configures a neural network 312 and creates a training environment 314 in order to perform the training process. The training environment 314 may be similar to the simulation and game environment 302. As part of process 208 from the method 200, a trained machine learning agent model 316 is sent to the simulation and game environment 302 to be displayed to the user 130. In accordance with an embodiment, process 208 may display the trained machine learning agent within the training environment 314. As part of process 224 of the method 200, the trainer 310 may send a request 318 to the user via a user interface in the game environment 302, the request asking for more samples 304 from the user 130.

While illustrated in the block diagrams as groups of discrete components communicating with each other via distinct data signal connections, it will be understood by those skilled in the art that the various embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
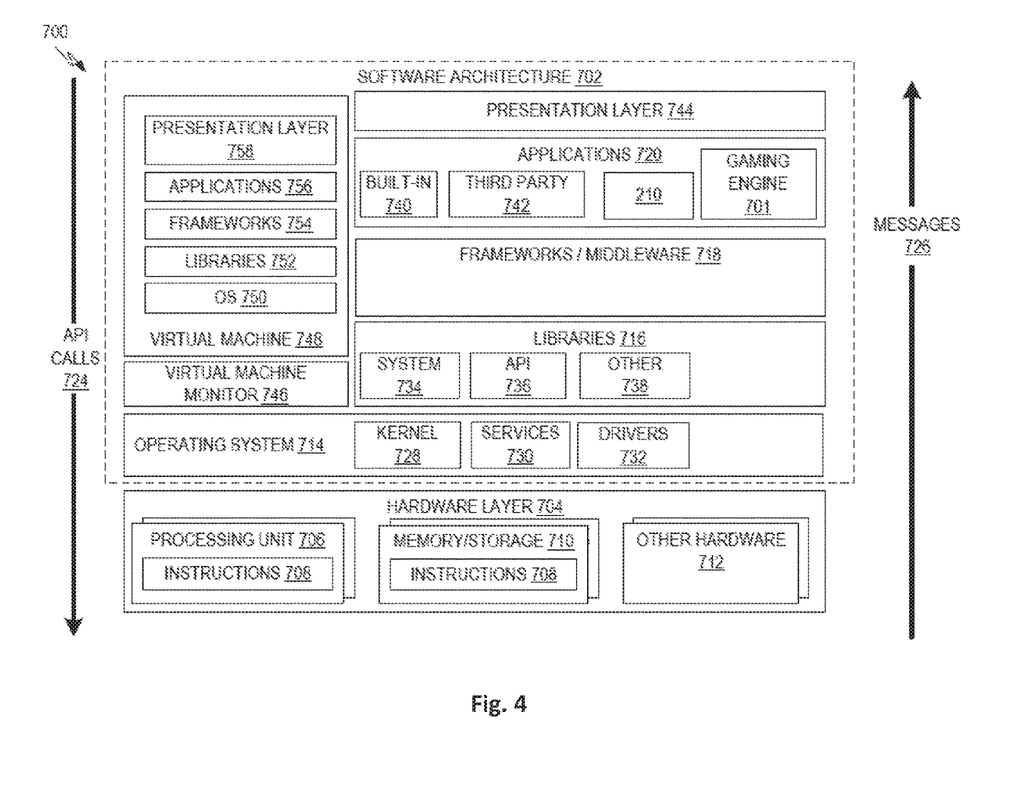
FIG. 4 is a block diagram illustrating an example software architecture, which may be used in conjunction with various hardware architectures described herein.

FIG. 4 is a block diagram 700 illustrating an example software architecture 702, which may be used in conjunction with various hardware architectures herein described to provide a gaming engine 701 and/or components of the Interactive Imitation system 100. FIG. 4 is a non-limiting example of a software architecture and it will be appreciated that many other architectures may be implemented to facilitate the functionality described herein. The software architecture 702 may execute on hardware such as a machine 800 of FIG. 5 that includes, among other things, processors 810, memory 830, and input/output (I/O) components 850. A representative hardware layer 704 is illustrated and can represent, for example, the machine 800 of FIG. 5. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 4, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 4, this is illustrated by a virtual machine 748. The virtual machine 748 creates a software environment where applications/modules can execute as if they were executing on a hardware machine (such as the machine 800 of FIG. 5, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 5:
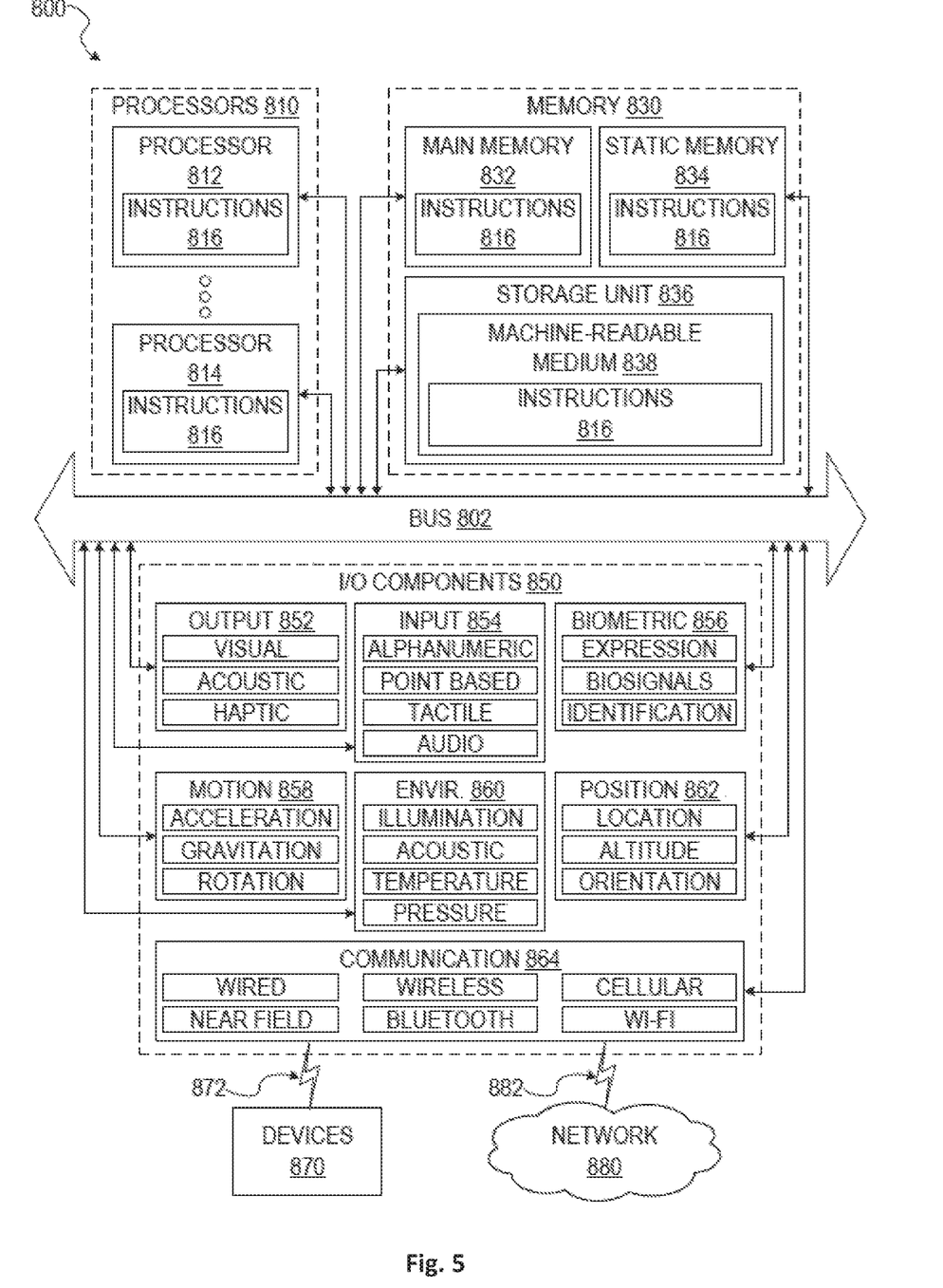
FIG. 5 is a block diagram illustrating components of a machine, according to some example embodiments, configured to read instructions from a machine-readable medium (e.g., a machine-readable storage medium) and perform any one or more of the methodologies discussed herein.

FIG. 5 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 5 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 5 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 5. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
   one or more computer processors;
   one or more computer memories;
   a set of instructions incorporated into the one or more computer memories, the set of instructions configuring the one or more computer processors to perform operations comprising:
   receiving input from an input device, the input including data describing a first set of example actions defining a behavior for a virtual character;
   using inverse reinforcement learning to estimate a reward function for the set of example actions;
   using the reward function and the set of example actions as input to a reinforcement learning model to train a machine learning agent to mimic the behavior in a training environment;
   analyzing a plurality of actions performed by the trained machine learning agent in the training environment to determine a measure of failure of the training of the machine learning agent, wherein analyzing a plurality of actions performed by the machine learning agent in the training environment comprises: displaying an action from the plurality of actions of the machine learning agent to a human via a display device; receiving from the human, via the input device, a label for the action, the label including a measure of failure for the action; and evaluating a plurality of labels to determine a measure of failure for the training, the plurality of labels including the label for the action;
   based on the measure of failure reaching a threshold, pausing the training of the machine learning agent to request a second set of example actions from the input device; and using the second set of example actions in addition to the first set of example actions to estimate a new reward function.

2. The system of claim 1, wherein the input includes human instructions as captured by the input device and wherein the human instructions are used to control the actions of the virtual character.

3. The system of claim 1, wherein the requesting of one or more new example actions includes sending a request to a human via a user interface on a display device.

4. The system of claim 1, wherein analyzing a plurality of actions performed by the machine learning agent in the training environment includes using machine learning methods to evaluate the actions and perform the determining of the measure of failure.

5. The system of claim 1, wherein the displaying of the action is performed at high speed, the high speed being a speed that is faster than a pre-defined normal speed.

6. The system of claim 5, wherein a user interface element is displayed on the display device contemporaneously with the displayed action, the user interface element including controls for the speed and controls for adding and modifying the label.

7. A method comprising:
receiving input from an input device, the input including data describing a first set of example actions defining a behavior for a virtual character;
using inverse reinforcement learning to estimate a reward function for the set of example actions;
using the reward function and the set of example actions as input to a reinforcement learning model to train a machine learning agent to mimic the behavior in a training environment;
analyzing a plurality of actions performed by the trained machine learning agent in the training environment to determine a measure of failure of the training of the machine learning agent, wherein analyzing a plurality of actions performed by the machine learning agent in the training environment comprises displaying an action from the plurality of actions of the machine learning agent to a human via a display device receiving from the human, via the input device, a label for the action, the label including a measure of failure for the action, and evaluating a plurality of labels to determine a measure of failure for the training, the plurality of labels including the label for the action;
based on the measure of failure reaching a threshold, pausing the training of the machine learning agent to request a second set of example actions from the input device; and
using the second set of example actions in addition to the first set of example actions to estimate a new reward function.

8. The method of claim 7, wherein the input includes human instructions as captured by the input device and wherein the human instructions are used to control the actions of the virtual character.

9. The method of claim 7, wherein the requesting of one or more new example actions includes sending a request to a human via a user interface on a display device.

10. The method of claim 7, wherein analyzing a plurality of actions performed by t machine learning agent in the training environment includes using machine learning methods to evaluate the actions and perform the determining of the measure of failure.

11. The method of claim 7, wherein the displaying of the action is performed at high speed, the high speed being a speed that is faster than a pre-defined normal speed.

12. The method of claim 11, wherein a user interface element is displayed on the display device contemporaneously with the displayed action, the user interface element including controls for the speed and controls for adding and modifying the label.

13. A non-transitory computer-readable medium storing a set of instructions that, when executed by one or more computer processors, cause the one or more computer processors to perform comprising:
receiving input from an input device, the input including data describing a first set of example actions defining a behavior for a virtual character;
using inverse reinforcement learning to estimate a reward function for the set of example actions;
using the reward function and the set of example actions as input to a reinforcement learning model to train a machine learning agent to mimic the behavior in a training environment;
analyzing a plurality of actions performed by the trained machine learning agent in the training environment to determine a measure of failure of the training of the machine learning agent, wherein analyzing a plurality of actions performed by the machine learning agent in the training environment comprises displaying an action from the plurality of actions of the machine learning agent to a human via a display device, receiving from the human, via the input device, a label for the action, the label including a measure of failure for the action, and evaluating a plurality of labels to determine a measure of failure for the training, the plurality of labels including the label for the action;
based on the measure of failure reaching a threshold, pausing the training of the machine learning agent to request a second set of example actions from the input device; and
using the second set of example actions in addition to the first set of example actions to estimate a new reward function.

14. The non-transitory computer-readable medium of claim 13, wherein the input includes human instructions as captured by the input device and wherein the human instructions are used to control the actions of the virtual character.

15. The non-transitory computer-readable medium of claim 13, wherein the requesting of one or more new example actions includes sending a request to a human via a user interface on a display device.

16. The non-transitory computer-readable medium of claim 13, wherein analyzing a plurality of actions performed by the machine learning agent in the training environment includes using machine learning methods to evaluate the actions and perform the determining of the measure of failure.

17. The non-transitory computer-readable medium of claim 13, wherein the displaying of the action is performed at high speed, the high speed being a speed that is faster than a pre-defined normal speed.

* * * * *